US012780334B2

(12) United States Patent
Schlautman

(10) Patent No.: US 12,780,334 B2
(45) Date of Patent: Nov. 3, 2026

(54) TRUSS BRACKET AND HITCH CONNECTOR SYSTEM

(71) Applicant: Valmont Industries, Inc., Omaha, NE (US)

(72) Inventor: Darin J. Schlautman, Lincoln, NE (US)

(73) Assignee: Valmont Industries, Inc.

( * ) Notice: Subject to any disclaimer, the term of this patent is extended or adjusted under 35 U.S.C. 154(b) by 545 days.

(21) Appl. No.: 18/456,124

(22) Filed: Aug. 25, 2023

(65) Prior Publication Data

US 2024/0075995 A1 Mar. 7, 2024

Related U.S. Application Data

(60) Provisional application No. 63/402,992, filed on Sep. 1, 2022.

(51) Int. Cl.

| | |
|---|---|
| ***B62D 49/06*** | (2006.01) |
| ***A01B 59/00*** | (2006.01) |
| ***A01G 25/09*** | (2006.01) |
| *B60D 1/00* | (2006.01) |

(52) U.S. Cl.

CPC .......... *B62D 49/065* (2013.01); *A01B 59/002* (2013.01); *A01G 25/09* (2013.01); *B60D 2001/008* (2013.01)

(58) Field of Classification Search

CPC ...... B62D 49/065; B62D 49/06; B62D 49/00; B62D 2001/008; B62D 2001/001; B62D 1/00; A01B 59/002; A01B 59/00; A01G 25/09; A01G 25/00

See application file for complete search history.

(56) References Cited

U.S. PATENT DOCUMENTS

| | | | | |
|---|---|---|---|---|
| 4,041,975 A | | 8/1977 | Ames | |
| 4,434,936 A | * | 3/1984 | Chapman | A01G 25/092 239/731 |
| 7,384,008 B1 | | 6/2008 | Malsam | |
| 9,066,475 B1 | * | 6/2015 | Toman | A01G 25/095 |
| 11,242,947 B2 | | 2/2022 | Korus et al. | |
| 2007/0176030 A1 | | 8/2007 | Korus | |

OTHER PUBLICATIONS

International Application PCT/US2023/72917 International Written Opinion mailed Nov. 20, 2023, 6 pages.

* cited by examiner

*Primary Examiner* — Christopher J Sebesta

(74) *Attorney, Agent, or Firm* — Milligan PC LLO

(57) ABSTRACT

A pipe connection system for attaching truss rods and other irrigation system components to an irrigation pipe. According to a first preferred embodiment, the attachment system includes a truss angle bracket assembly, a hitch channel lock assembly and a truss rod bracket assembly which are designed and positioned to attach to a single pipe section. According to a further preferred embodiment, the truss bracket assembly, the hitch channel lock assembly and the truss rod bracket assembly are each formed of single part/die surfaces which are laser-cut and bent on a transfer press to provide multiple sections formed from the single part/die surfaces.

22 Claims, 16 Drawing Sheets

A-A

TRUSS BRACKET AND HITCH CONNECTOR SYSTEM

RELATED APPLICATIONS

The present application claims priority to U.S. Provisional Application No. 63/402,992 filed Sep. 1, 2022.

BACKGROUND AND FIELD OF THE PRESENT INVENTION

Field of the Present Invention

The present invention relates generally to irrigation machines and, more particularly, to a pipe attachment system including a truss angle bracket assembly, a hitch channel lock assembly and a truss rod bracket assembly.

Background of the Invention

Modern field irrigation machines are combinations of drive systems and sprinkler systems. Common irrigation machines most often include an overhead sprinkler irrigation system consisting of several segments of pipe (usually galvanized steel or aluminum) joined together and supported by trusses, mounted on wheeled towers with sprinklers positioned along its length. To move, each of the various spans/segments of supported pipe are linked together using a combination of linking components such as welded trusses and hitches. Each of these core components must withstand significant shearing forces as the irrigation system moves. The moving pipe section may be generally referred to as a swivel pipe, corner pipe or the like.

In the prior art, truss brackets and other core linking components are generally made by welding a number of stamped, progressive die manufactured components together. For example, common truss bracket designs generally include 3-4 components which are connected together, most commonly by welding, resulting in many long welds, in some cases as much as 10 inches per assembly. Accordingly, the quality of the welds is important, and defective welds can result in immediate failure of the irrigation span.

Applying such welds in the manufacturing process can be complicated and they can vary significantly in quality. Among other drawbacks, broken welds are required to be fixed in the field which is an expensive and time consuming process for an operator, and are usually of inferior quality due to the presence of galvanizing.

What is needed is an improved pipe connection system for attaching truss rods and other irrigation system components to an irrigation pipe which are strong enough to withstand the extensive forces applied to mechanized irrigation systems and the like. Additionally, what is needed is an improved method of manufacturing which minimizes the use of welds and the like.

SUMMARY OF THE DISCLOSURE

To minimize the limitations found in the prior art, and to minimize other limitations that will be apparent upon the reading of the specifications, the present invention provides an improved pipe connection system for attaching truss rods and other irrigation system components to an irrigation pipe.

According to a first preferred embodiment, the attachment system of the present invention preferably includes a truss angle bracket assembly, a hitch channel lock assembly and a truss rod bracket assembly which are each designed to minimize welds and which are positioned to attach to a single pipe section.

According to a further preferred embodiment, the truss bracket assembly of the present invention preferably includes a single part/die surface that is cut with a laser and bent on a transfer press to provide multiple sections formed from the single part/die surface.

According to a further preferred embodiment, the present invention further includes a hitch channel lock assembly which includes a single laser cut piece that is then folded using bending stations.

According to another embodiment, the present invention may preferably include a truss rod bracket assembly having a single U-shaped central body which is mechanically interlocked with two truss rod bracket sidewalls. Preferably, the improved connection is stronger than welds, and eliminates the need for weld quality control.

DESCRIPTION OF THE PREFERRED EMBODIMENTS

Reference is now made in detail to the exemplary embodiments of the invention, examples of which are illustrated in the accompanying drawings. Wherever possible, the same reference numbers will be used throughout the drawings to refer to the same or like parts. The description, embodiments and figures are not to be taken as limiting the scope of the claims. It should also be understood that throughout this disclosure, unless logically required to be otherwise, where a process or method is shown or described, the steps of the method may be performed in any order, repetitively, iteratively or simultaneously. As used throughout this application, the word “may” is used in a permissive sense (i.e., meaning “having the potential to’), rather than the mandatory sense (i.e. meaning “must”).

Additionally, any examples or illustrations given herein are not to be regarded in any way as restrictions on, limits to, or express definitions of, any term or terms with which they are utilized. Instead, these examples or illustrations are to be regarded as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms.

Figure 1:
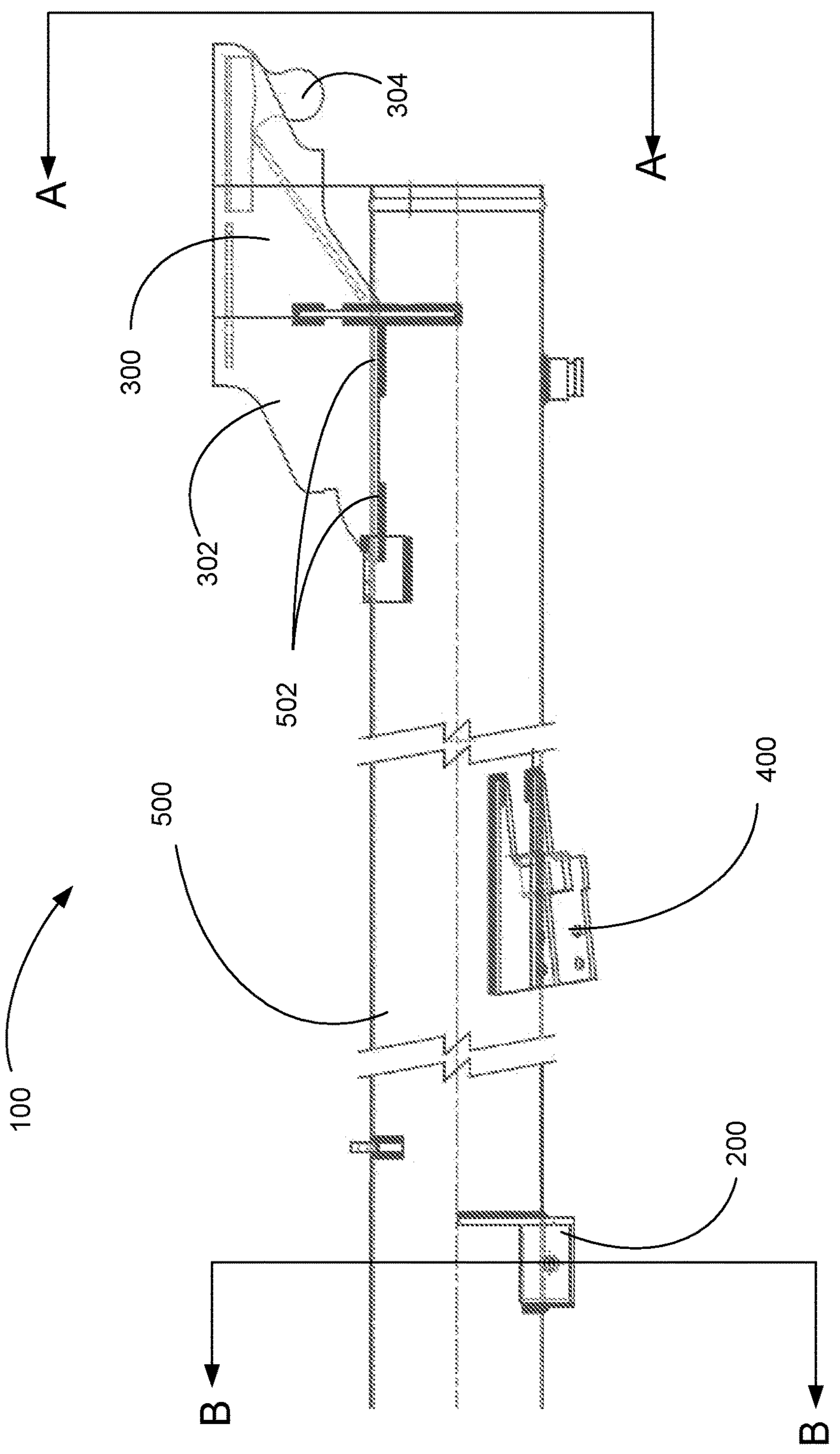
FIG. 1 is a side view of an exemplary irrigation pipe attachment system in accordance with a first preferred embodiment of the present invention.
Figure 2:
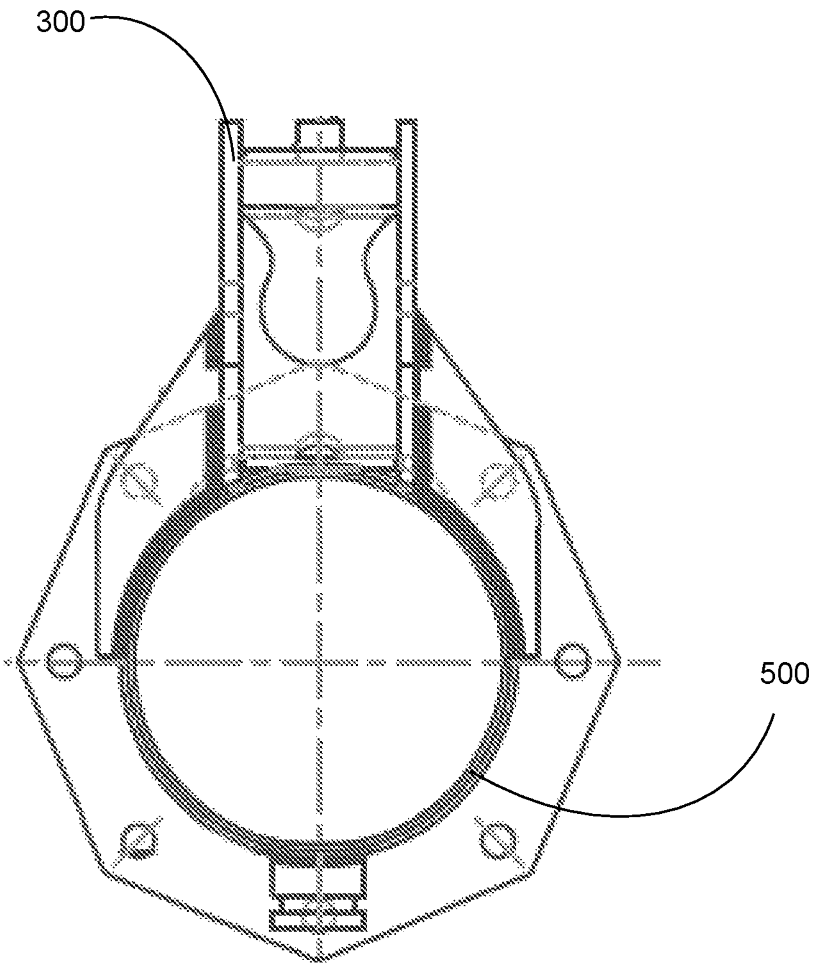
FIG. 2 is a front view of the irrigation pipe attachment system shown in FIG. 1.
Figure 3:
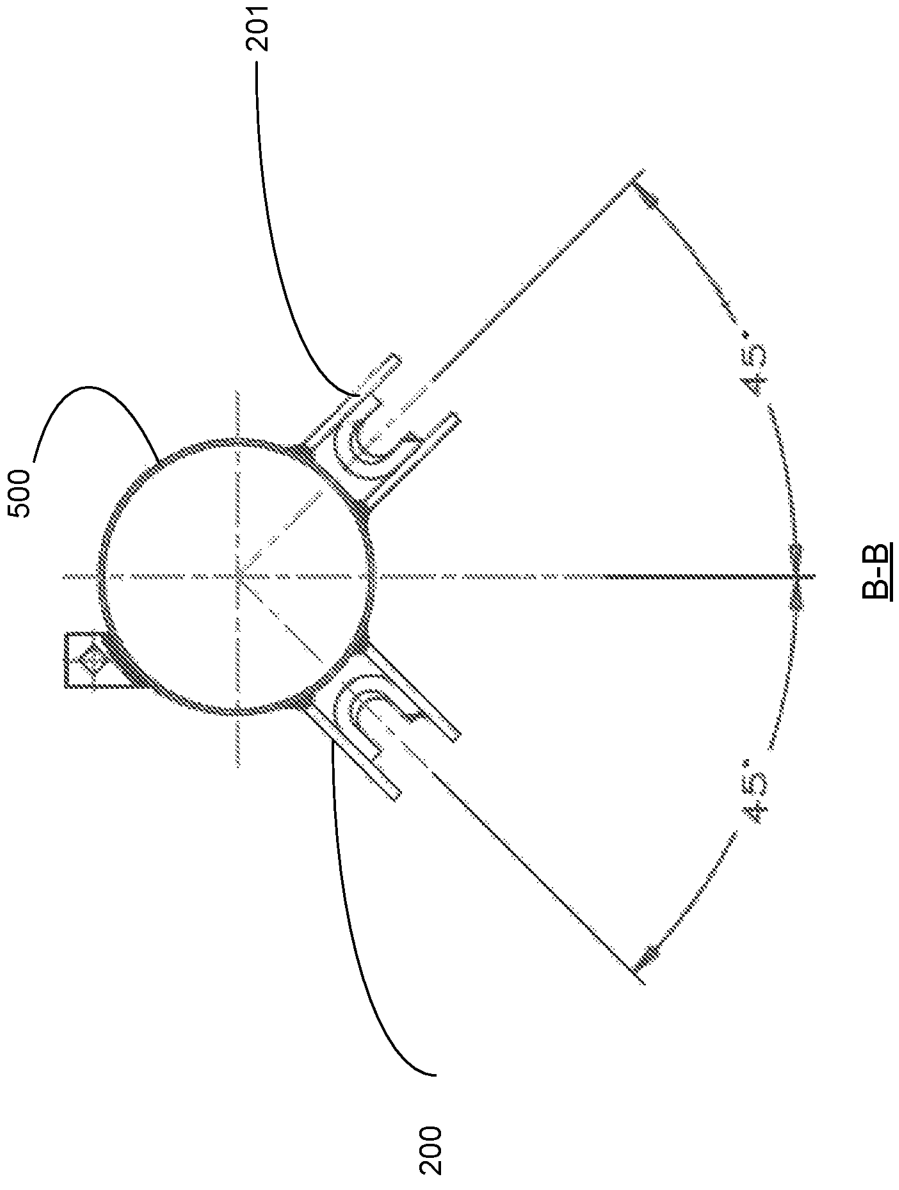
FIG. 3 is a cut-away view of the irrigation pipe attachment system shown in FIG. 1 cut along the line B-B.

With reference now to FIGS. 1-3, a first set of exemplary views of the irrigation pipe attachment system of the present invention shall now be discussed. Referring first to FIG. 1, the exemplary irrigation pipe attachment system 100 in accordance with a first preferred embodiment of the present invention preferably includes a truss angle bracket 200, a hitch channel lock assembly 300, and a truss rod bracket assembly 400 which are each preferably attached to a given span/swivel pipe 500. FIG. 2 provides a front view of the irrigation pipe attachment system 100 shown in FIG. 1 from the direction indicated in line A-A illustrating a front view of the hitch channel lock assembly 300 as discussed further below. FIG. 3 shows a view of the irrigation pipe attachment system 100 shown in FIG. 1 cut along the line B-B which provides a view of a pair of truss angle brackets 200, 201 attached to a central span/swivel pipe 500.

According to preferred embodiments, the truss angle bracket 200, hitch channel lock assembly 300, and truss rod bracket assembly 400 may preferably be formed from aluminum, galvanized steel or the like. These components may preferably be cut via a laser or the like and shaped using a brake press or similar method. According to a further preferred embodiment, the assemblies 200, 300, 400 of the present invention may preferably be welded to a thin wall tube/pipe 500 to form an irrigation pipe that is then assembled with trussing, truss rods, truss rod sockets and a drive unit to form an irrigation span.

Figure 4:
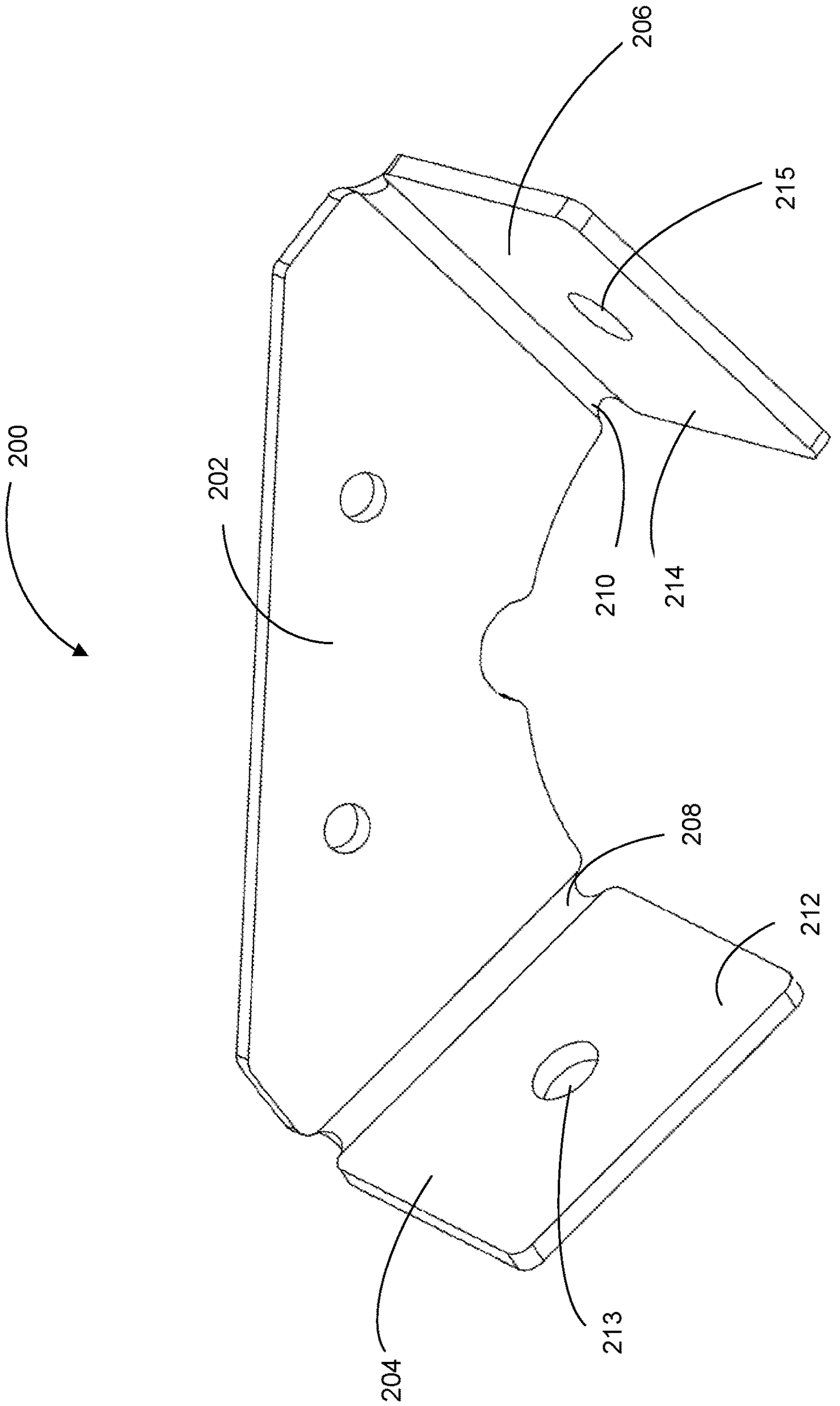
FIG. 4 is an illustration of an exemplary truss bracket in accordance with a first preferred embodiment of the present invention.
Figure 5:
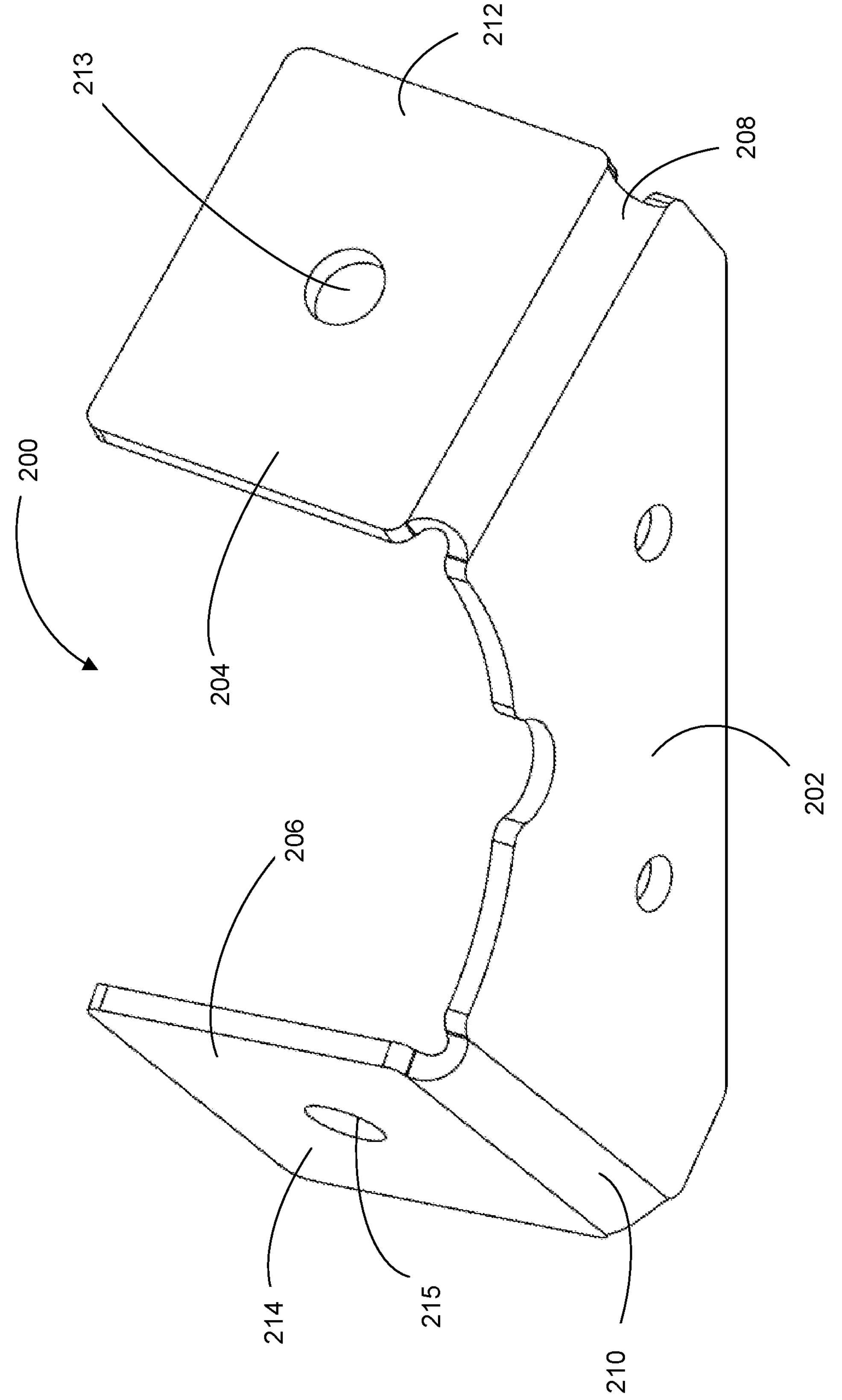
FIG. 5 is a rear perspective view of the exemplary truss bracket shown in FIG. 4.
Figure 6:
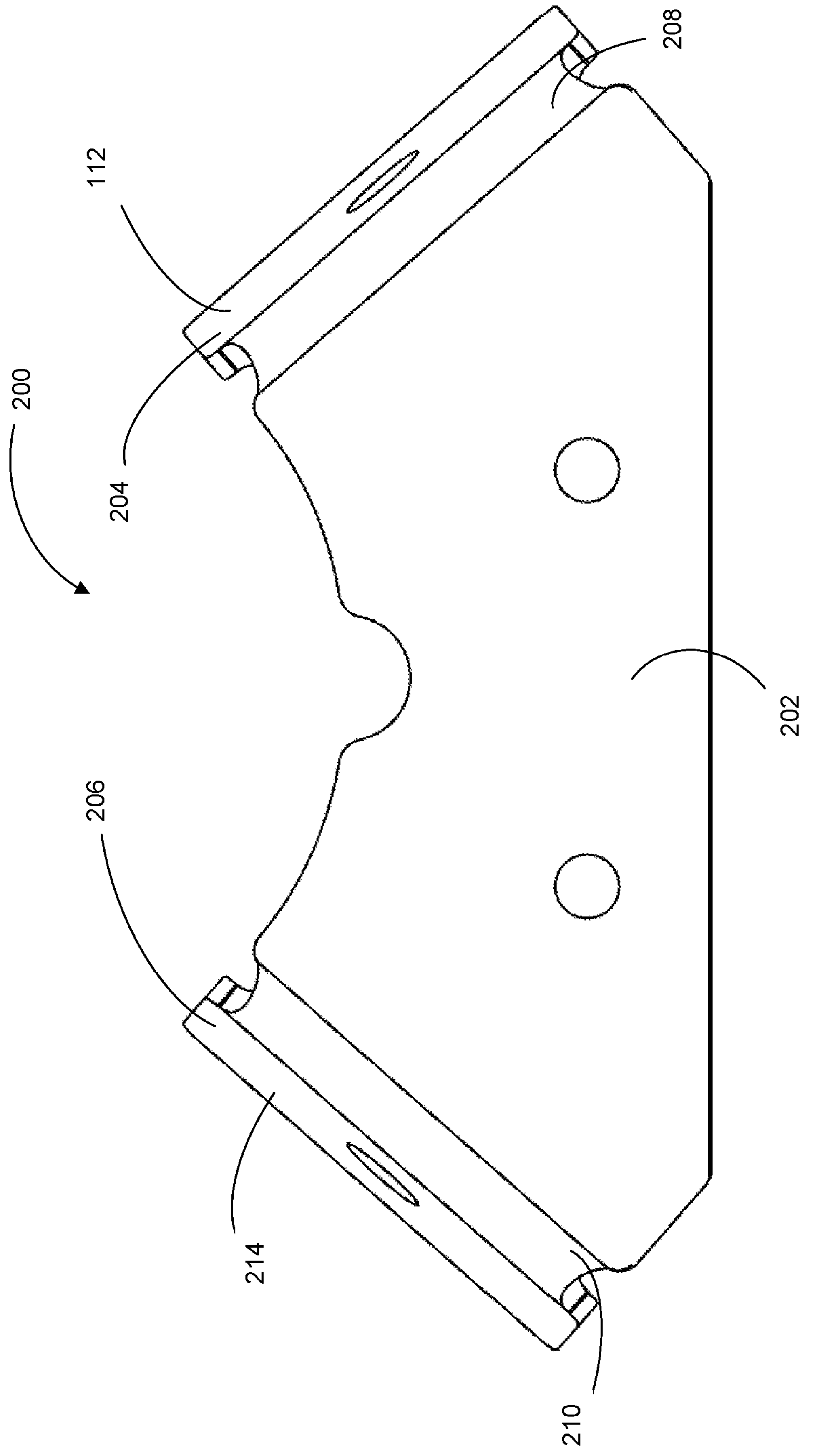
FIG. 6 is a front view of the exemplary truss bracket shown in FIG. 5.

Referring now to FIGS. 4-8, exemplary embodiments of a truss bracket 200 in accordance with the present invention shall now be discussed. As discussed above, the exemplary truss bracket 200 of the present invention may preferably be formed of a uniform laser-cut piece of metal which may preferably be aluminum, galvanized steel or the like. Preferably, the single surface of the truss bracket 200 may be pressed (i.e., bent) to form several sections which may each be selectively oriented as discussed further herein. FIG. 4 shows an illustration of an exemplary truss bracket 200 in accordance with a first preferred embodiment of the present invention. FIG. 5 shows a rear perspective view of the exemplary truss bracket 200 and FIG. 6 shows a front view of the same.

As shown in FIGS. 4-6, the surface of the truss bracket 200 preferably may include a central backing section 202 connected to a right extension arm 204 and a left extension arm 206. Preferably, each extension arm 204, 206 may be oriented to be at or near perpendicular to the backing section 202. Alternatively, the extension arms 204, 206 may be oriented at any of a variety of angles relative to each other as well as relative to the backing section 202.

As shown, the right extension arm 204 may preferably be connected to the central backing section 202 via a first bent section 208. The right extension arm 204 preferably includes a right securing surface 212 which may include one or more bolt holes 213 for securing the truss bracket 200 to an external structural member (not shown). The position of the right securing surface 212 relative to the central backing section 202 may preferably be determined at least in part by the degree of bend applied to the first bent section 208.

As further shown, the left extension arm 206 may preferably be connected to the central backing section 202 via a second bent section 210. The left extension arm 206 preferably further includes a left securing surface 214 which may include one or more bolt holes 215 for securing the truss bracket 200 to an external structural member (not shown). Thus, the position of the left securing surface 214 relative to the central backing section 202 may preferably be determined at least in part by the degree of bend applied to the second bent section 210.

Figure 7:
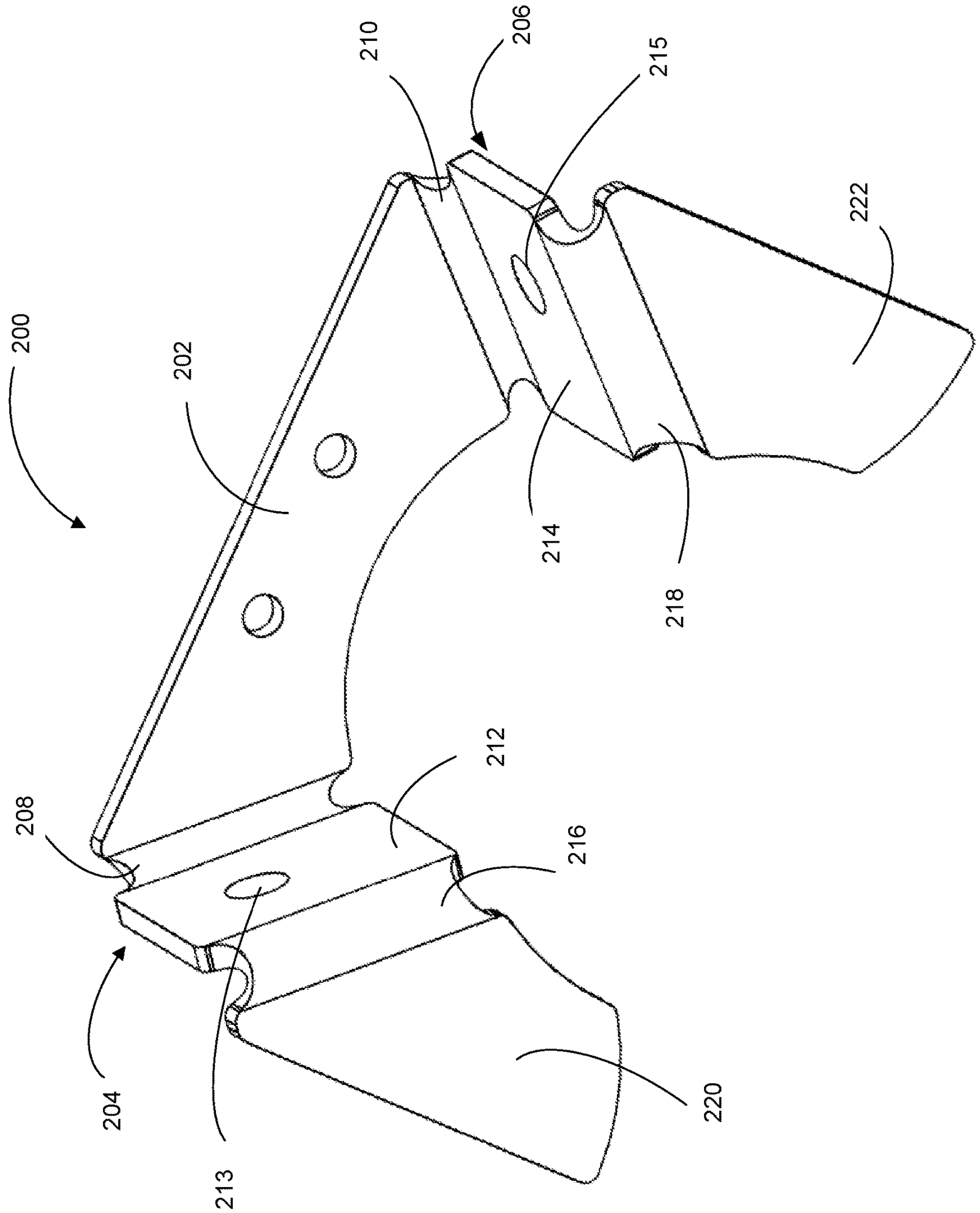
FIG. 7 is a front perspective view of a first alternative embodiment of an extended truss bracket.
Figure 8:
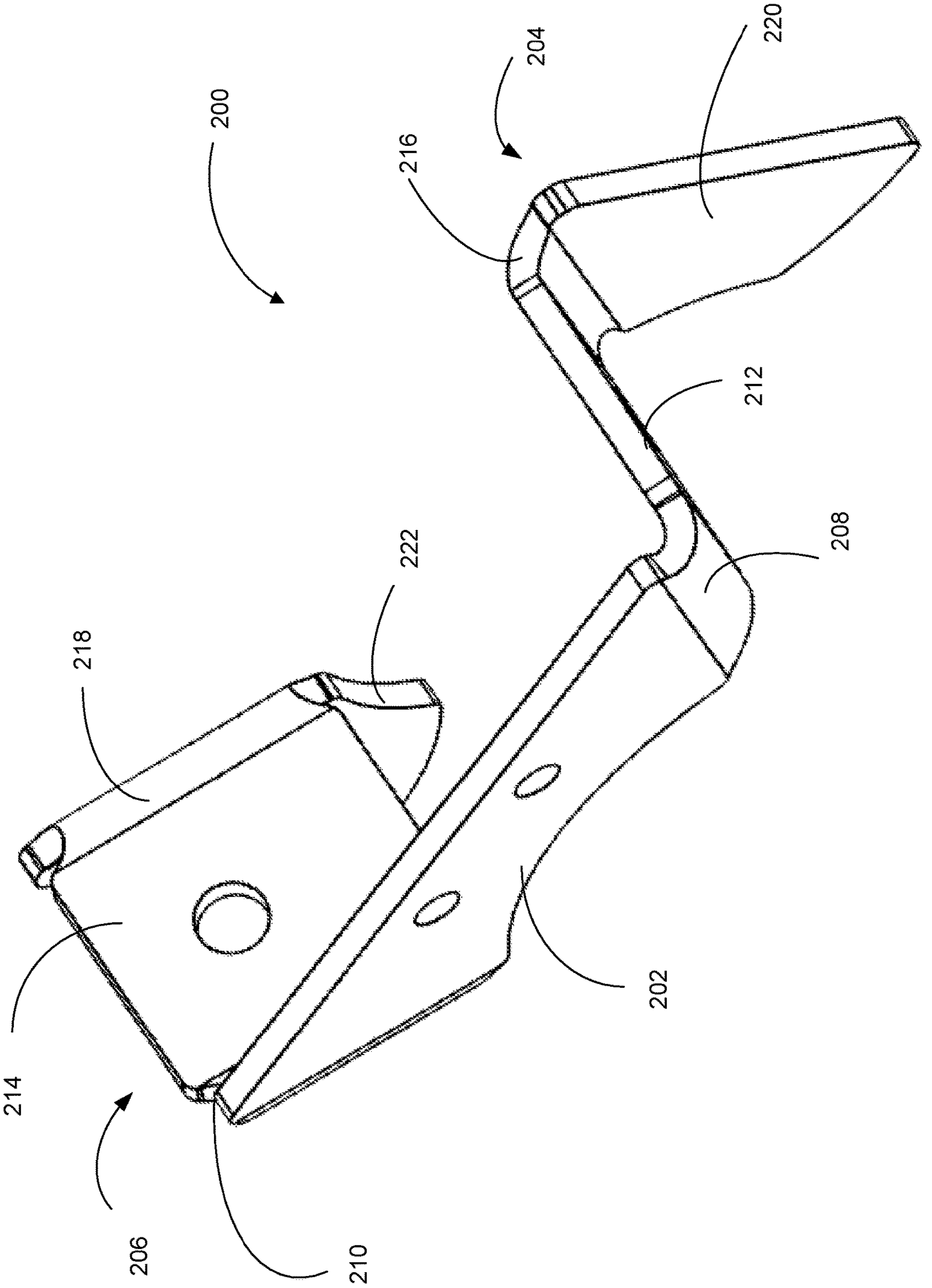
FIG. 8 is a rear perspective view of the exemplary truss bracket shown in FIG. 7.

With reference now to FIGS. 7 and 8, according to alternative embodiments, additional outer surfaces and sections may be added to the truss bracket 200 without departing from the scope of the present invention. As an example, FIG. 7 provides a first front perspective view of the truss bracket 200 discussed above with additional sections included. FIG. 8 shows a rear perspective view of the exemplary truss bracket 200 shown in FIG. 7.

As shown in FIGS. 7-8, the right extension arm 204 of the truss bracket 200 may preferably further include a right outer surface 220 extending from the right securing surface 212. Preferably, the right securing surface 212 is connected to the right outer surface 220 via a third bent section 216. The right outer surface 220 may be substantially parallel to the central backing section 202 with its position determined at least in part by the degree of bend in the third bent section 216.

As further shown in FIGS. 7-8, the truss bracket 200 may further include a left outer surface 222 connected to the left securing surface 214 via a fourth bent section 218. The left outer surface 222 may preferably be substantially parallel to the central backing section 202 with its position determined at least in part by the degree of bend applied to the fourth bent section 218.

In use, a separate flat reinforcing plate may be welded to bends 216 and 218 to further reinforce the bracket 200. The exemplary bracket 200 may further be welded to a given irrigation pipe 500 (as discussed with reference to FIG. 1), with or without an additional bracket, to ensure the proper transfer of loads between attached bracket(s) and the irrigation pipe 500, and without creating stress concentrations that could cause cracks in the irrigation pipe 500 or other brackets thus reducing the life of the irrigation span.

With reference now to FIGS. 9-13, details of an exemplary hitch channel lock assembly 300 of the present invention shall now be discussed. As discussed in further detail below, the hitch channel lock assembly 300 of the present invention may be a 2-piece assembly which includes tabs and bends to properly position a hitch ball 304 in the bracket 300 without separate positioning tooling.

Figure 9:
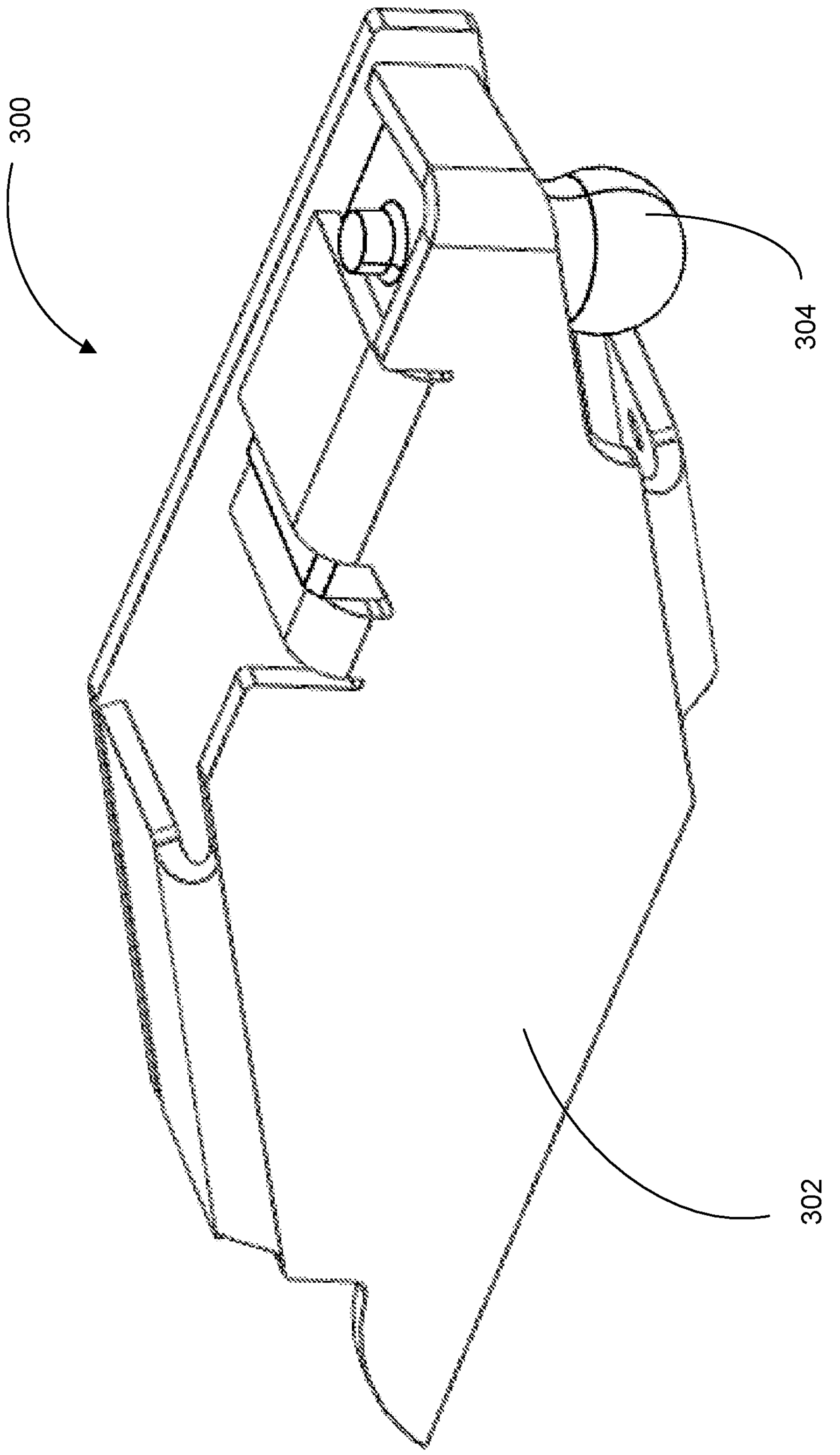
FIG. 9 is a perspective view of an exemplary hitch channel lock assembly in accordance with a preferred embodiment of the present invention.
Figure 10:
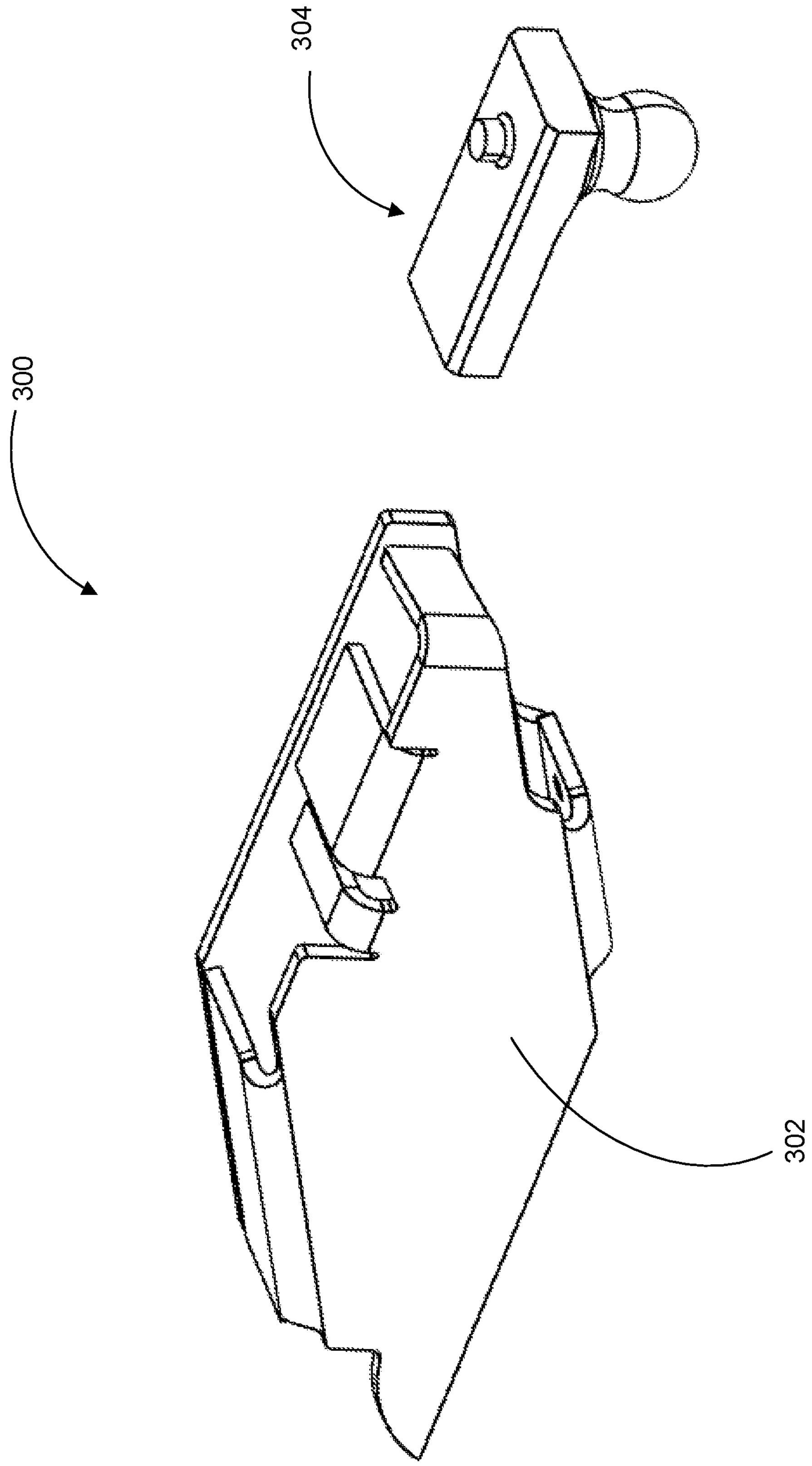
FIG. 10 is a view of the hitch channel lock assembly shown in FIG. 9 with the hitch ball assembly separated.
Figure 11:
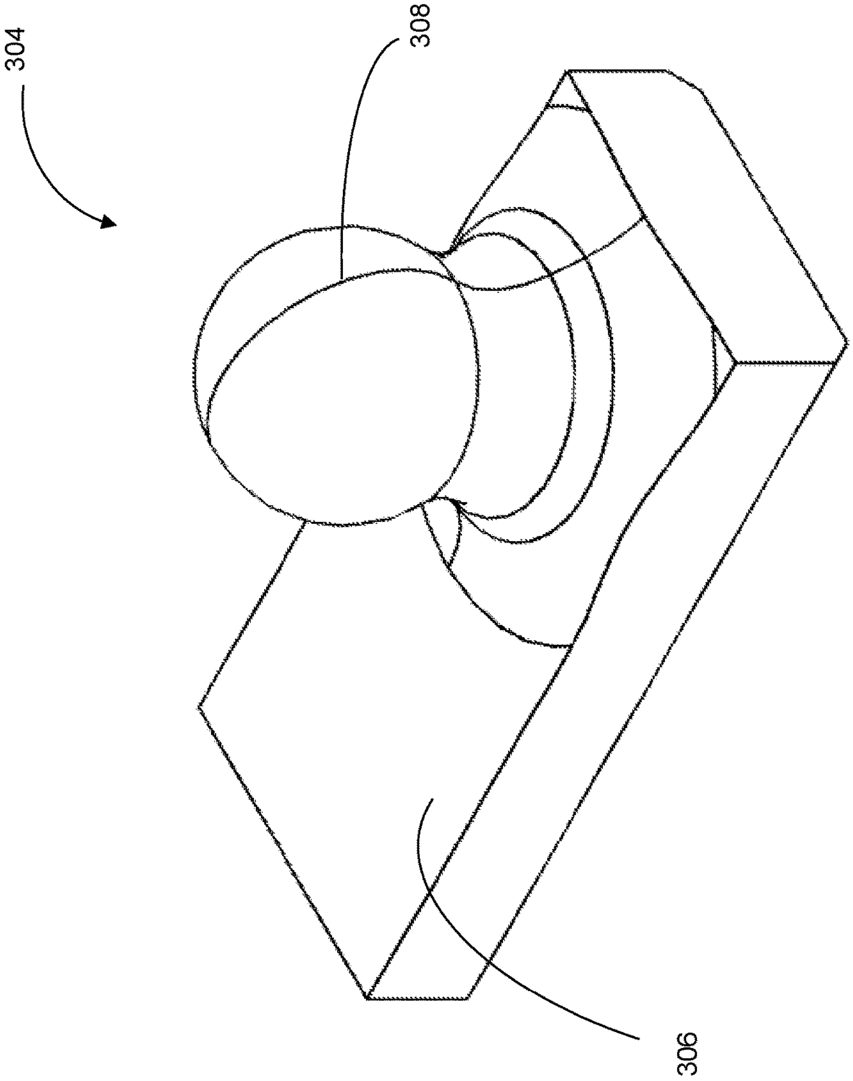
FIG. 11 is an enlarged view of the exemplary hitch ball assembly shown in FIG. 9.

As shown in FIGS. 9-11, the exemplary hitch channel lock assembly 300 of the present invention may preferably include a hitch channel body 302 which integrates with the separately formed hitch ball assembly 304. As shown, this engagement allows the proper placement of the forged hitch ball 304 without special positioning tooling. Subsequently, the hitch ball 304 may be welded to the hitch channel body 302. When used, the hitch channel body 302 of the present invention preferably reduces the number of components and number of welds required to manufacture the integrated lock assembly 300 component. FIG. 11 provides an enlarged view of an exemplary hitch ball assembly 304 for use with the present invention. As shown, the exemplary hitch ball assembly 304 may preferably include a hitch securing block 306 and ball 308 which are formed to securely fit within the hitch channel body 302.

Figure 12:
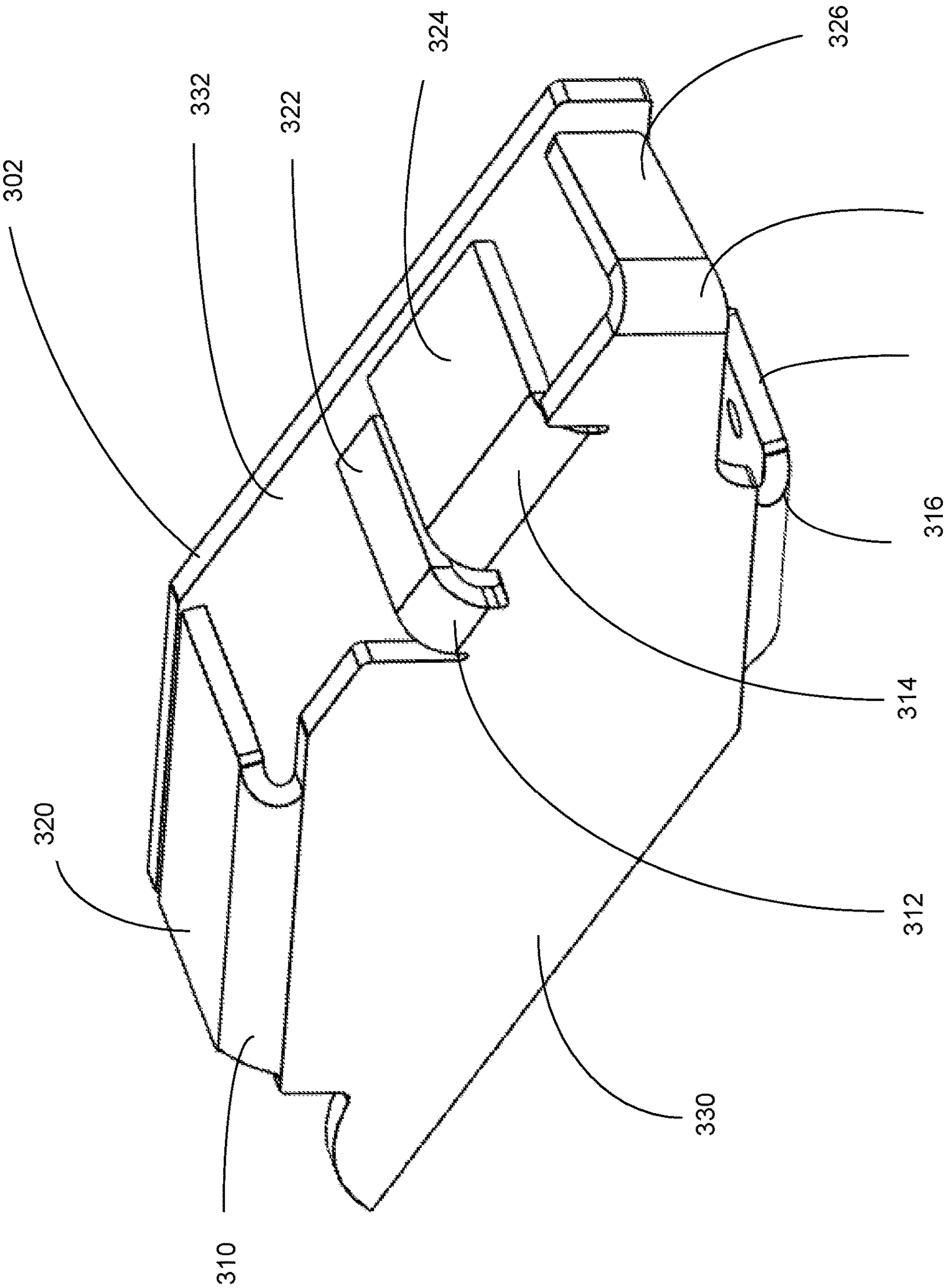
FIG. 12 is a right perspective view of the hitch channel body shown in FIG. 9.
Figure 13:
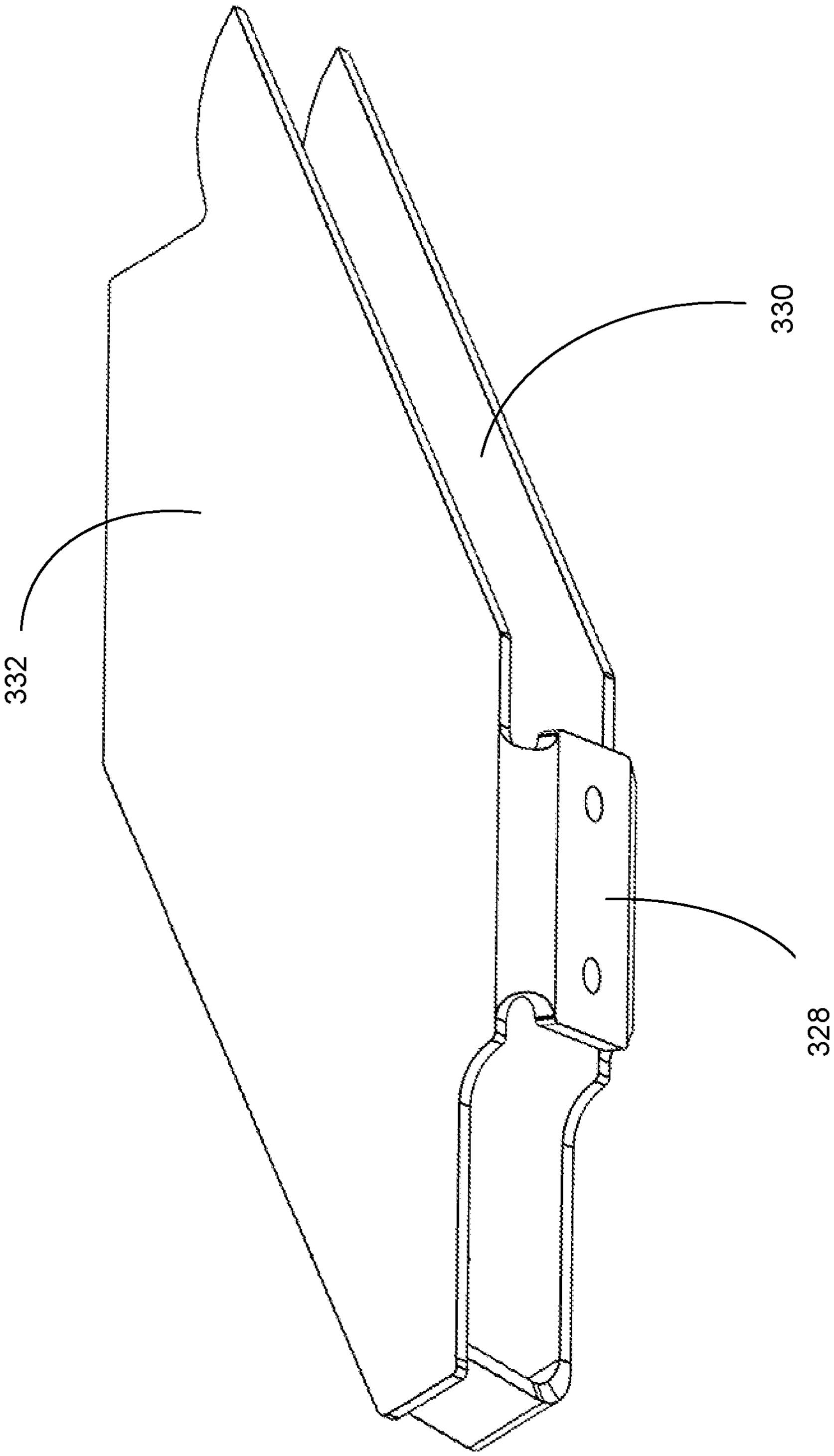
FIG. 13 is a left perspective view of the hitch channel body shown in FIG. 10.

Referring now to FIG. 12, an enlarged, right perspective view of the hitch channel body 302 (as shown in FIGS. 9-10 above) is provided. Additionally, FIG. 13 shows an enlarged, left perspective view of the hitch channel body 302 shown in FIG. 10 above. As shown in FIG. 12, the hitch channel body 302 of the present invention is preferably formed of a single surface of generally uniform composition. Preferably, the single surface may be pressed (via a metal press or the like), or otherwise manipulated to provide a hitch channel body 302 for enclosing a hitch ball assembly (as discussed above) or other connecting surfaces.

As shown in FIG. 12, the exemplary hitch channel body 302 of the present invention may preferably include a right wall 330 and a left wall 332 which are integrally connected (i.e., formed from the same surface) and shaped to connect via connector plate 328 or other integrally formed section (i.e., also formed from the same surface). As shown, one or more overlay sections 320, 322, 324, 326 of the present invention (also formed from the single surface of the hitch channel body 302) may preferably be formed and oriented via respective bent sections 310, 312, 314, 318. As shown in FIG. 1, the hitch channel body 302 may be welded to an irrigation pipe 500 at one or more welding locations 502. The connector plate 328 of the present invention may preferably be oriented via bent section 316 for attachment to additional components of the irrigation machine, such as a tower box or the like.

Figure 14:
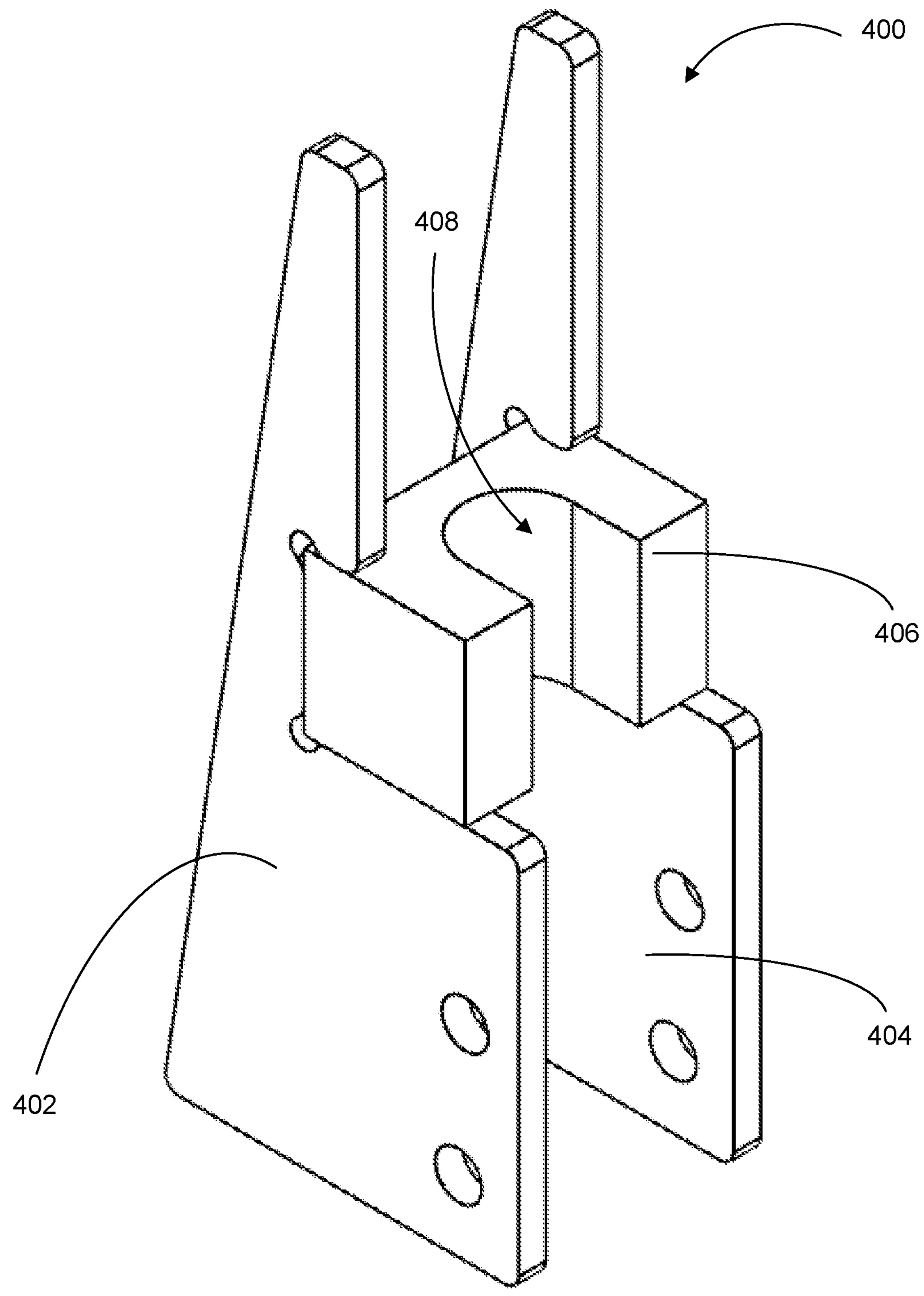
FIG. 14 is a perspective view of an exemplary truss rod bracket assembly of the present invention.
Figure 15:
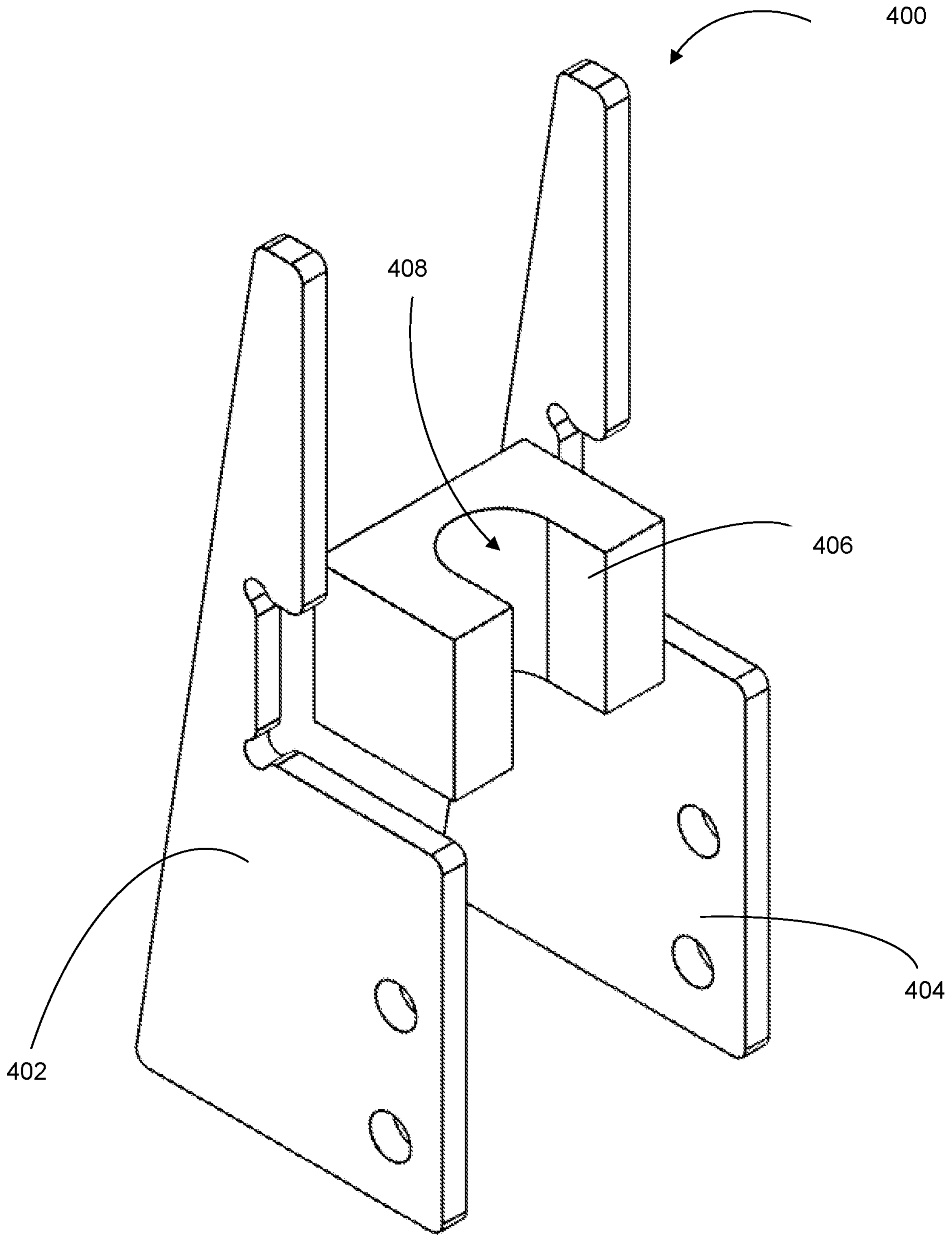
FIG. 15 is an exploded view of the exemplary truss rod bracket assembly shown in FIG. 14.
Figure 16:
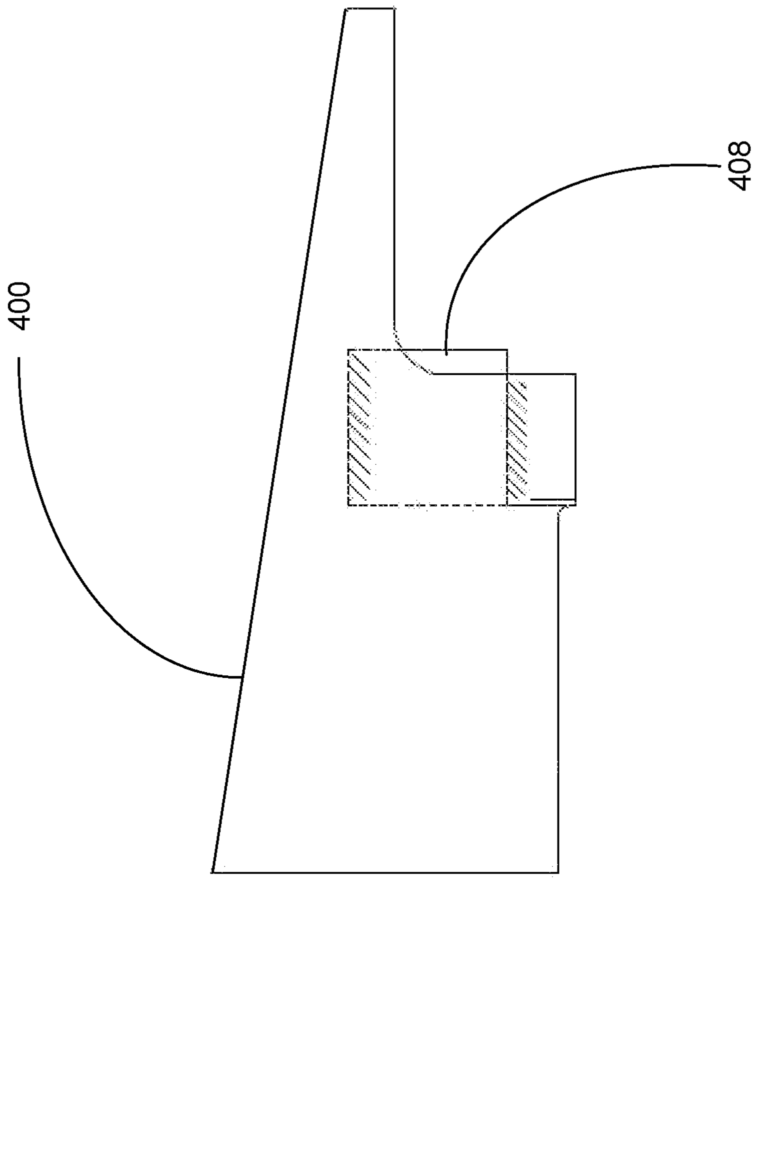
FIG. 16 provides a side view of the truss rod bracket assembly shown in FIG. 14 oriented for attachment to a given irrigation span.

With reference now to FIGS. 14-16, the design and key features of an exemplary truss rod bracket assembly 400 shall now be discussed. FIG. 14 provides a perspective view of an exemplary truss rod bracket assembly 400. FIG. 15 provides an exploded view of the same. As shown, the truss rod bracket assembly 400 of the present invention may preferably be formed of a right attachment wall 402, a left attachment wall 404 and a channel bracket 406. Preferably, the channel bracket 406 may be formed with an internal channel 408 to allow for the securing of a truss rod (not shown) therethrough. The truss rod bracket assembly 400 may be welded to an irrigation pipe 500 as shown in FIG. 1. FIG. 16 provides a side view of the truss rod bracket assembly 400 oriented for attachment to a given irrigation span.

As shown in FIGS. 14-16, the separate fitted pieces 402-406 of the truss rod bracket assembly 400 are preferably each formed of single surfaces which are generally uniform in their compositions. Though formed separately, each of the pieces 402-406 may preferably be welded together to maintain relative position. Independent of any securing weld, the individual pieces 402-406 are preferably mechanically interlocked so that any loads may be transferred through the mechanical interlock between the components. Accordingly, applied loads may preferably be transferred through the interlock between the channel bracket 406 (which holds the truss rod) and the side plates/walls 402, 404 (which preferably are welded to a given pipe). In this way, the mechanical interlock may be secured via the individual components 402-406 and not solely on the strengths of the welds.

The scope of the present invention should be determined not by the embodiments illustrated, but by the appended claims and their legal equivalents.

What is claimed is:

1. An irrigation pipe attachment system, wherein the system comprises:

a truss angle bracket assembly;

a hitch channel lock assembly;

a truss rod bracket assembly;

wherein at least one of the truss angle bracket assembly, the hitch channel lock assembly, and the truss rod bracket assembly is formed from a unitary metal blank and includes one or more bent sections defining load-bearing surfaces;

wherein at least one of the assemblies includes mechanically interlocked portions configured to transfer operational loads independently of weld joints;

wherein the mechanically interlocked portions include inter-engaging portions of the channel bracket and attachment walls of adjacent components that physically resist relative movement under load and define a primary load path between the components; and wherein any weld joints, when present, are configured to secure the components without carrying a majority of the operational loads;

wherein the mechanically interlocked portions are configured such that the truss rod bracket assembly maintains structural integrity under load in the absence of weld joints.

2. The system of claim 1, wherein the truss angle bracket assembly comprises:

a central backing section;

a right extension arm; wherein the right extension arm is connected to the central backing section via a first bent section; wherein the right extension arm comprises a right securing surface; wherein the right securing surface comprises at least one bolt hole;

wherein the right securing surface is substantially perpendicular to the central backing section; wherein the position of the right securing surface relative to the central backing section is determined at least in part by a degree of bend in the first bent section; and a left extension arm, wherein the left extension arm is connected to the central backing section via a second bent section; wherein the left extension arm comprises a left securing surface; wherein the left securing surface comprises at least one bolt hole;

wherein the left securing surface is substantially perpendicular to the central backing section; wherein the position of the left securing surface relative to the central backing section is determined at least in part by a degree of bend in the second bent section.

3. The system of claim 2, wherein the right extension arm comprises a right outer surface; wherein the right extension arm is connected to the right outer surface via a third bent section.

4. The system of claim 3, wherein the right outer surface is substantially parallel to the central backing section.

5. The system of claim 4, wherein the position of the right outer surface relative to the central backing section is determined at least in part by a degree of bend in the third bent section.

6. The system of claim 5, wherein the left extension arm comprises a left outer surface.

7. The system of claim 6, wherein the left extension arm is connected to the left outer surface via a fourth bent section.

8. The system of claim 7, wherein the left outer surface is substantially parallel to the central backing section.

9. The system of claim 8, wherein the position of the left outer surface relative to the central backing section is determined at least in part by a degree of bend in the fourth bent section.

10. The system of claim 1, wherein the hitch channel lock assembly comprises a hitch ball assembly and a hitch channel body.

11. The system of claim 10, wherein the hitch ball assembly comprises a hitch securing block and a hitch ball.

12. The system of claim 11, wherein the hitch ball assembly is located within the hitch channel body.

13. The system of claim 12, wherein the hitch channel body comprises a single surface of uniform composition.

14. The system of claim 13, wherein the hitch channel body comprises a right wall surface, a left side wall surface and a connector plate.

15. The system of claim 14, wherein the right wall surface and the left wall surface are integrally connected by the connector plate.

16. The system of claim 15, wherein the hitch channel body further comprises a plurality of overlay sections.

17. The system of claim 16, wherein the plurality of overlay sections are attached to a plurality of bent sections.

18. The system of claim 17, wherein the hitch channel body is attached to the irrigation pipe at one or more welding locations.

19. The system of claim 1, wherein the truss rod bracket assembly comprises a right attachment wall, a left attachment wall and a channel bracket.

20. The system of claim 19, wherein the channel bracket comprises an internal channel; wherein the internal channel is configured to secure a first truss rod.

21. The system of claim 20, wherein the channel bracket is located between the right attachment wall and the left attachment wall.

22. The system of claim 21, wherein the channel bracket is mechanically interlocked with the right attachment wall and the left attachment wall.

* * * * *